(12) United States Patent
Centauro

(10) Patent No.: US 6,366,052 B1
(45) Date of Patent: Apr. 2, 2002

(54) BATTERY SAVING ELECTRON FLOW BLOCKING SYSTEM

(76) Inventor: Michael A. Centauro, 191 Lisle St., Braintree, MA (US) 02184

( * ) Notice: Subject to any disclaimer, the term of this patent is extended or adjusted under 35 U.S.C. 154(b) by 0 days.

(21) Appl. No.: 09/765,460

(22) Filed: Jan. 22, 2001

(51) Int. Cl.[7] .................................................. H02J 7/00
(52) U.S. Cl. ............................................. 320/112; 429/99
(58) Field of Search ................................ 320/112, 107, 320/106, 108, 110, 114; 429/96–100

(56) References Cited

U.S. PATENT DOCUMENTS

| | | | |
|---|---|---|---|
| 4,494,854 A | 1/1985 | Yamaga et al. | 396/304 |
| 4,777,384 A | 10/1988 | Altenhof et al. | 307/141 |
| 4,798,968 A | 1/1989 | Deem | 307/10.7 |
| 5,173,653 A | 12/1992 | Hochstein | 320/135 |
| 5,204,608 A | 4/1993 | Koenck | 320/112 |
| 5,438,173 A | 8/1995 | Rudoy et al. | 307/10.3 |
| 5,800,937 A | * 9/1998 | Decker et al. | 429/61 |
| 5,977,745 A | * 11/1999 | Ryan | 320/106 |
| 6,018,230 A | * 1/2000 | Casey | 320/114 |

* cited by examiner

*Primary Examiner*—Gregory Toatley
*Assistant Examiner*—Lawrence Luk

(57) ABSTRACT

A battery saving electron flow blocking system for controlling the flow of electrons between a pair of batteries removably installed in a device and from between a battery and a conductor. The battery saving electron flow blocking system includes a blocking member comprising a panel movable into a position adjacent to one of the group of the first positive contacts and the first negative contacts in order to isolate the contacts from electrical communication with the conductor of the device. Additionally a track may be provided for guiding movement of the blocking member in the device.

11 Claims, 4 Drawing Sheets

BATTERY SAVING ELECTRON FLOW BLOCKING SYSTEM

BACKGROUND OF THE INVENTION

1. Field of the Invention

The present invention relates to battery powered devices and more particularly pertains to a new battery saving electron flow blocking system for controlling the flow of electrons between a pair of batteries removably installed in a device.

2. Description of the Prior Art

The use of battery powered devices is known in the prior art. More specifically, battery powered devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,777,384; 4,798, 968; 5,438,173; 5,173,653; 4,494,854; and 5,204.608.

While these devices fulfill their respective, particular objectives and requirements, the aforementioned patents do not disclose a new battery saving electron flow blocking system. The inventive device includes a blocking member comprising a panel movable into a position adjacent to one of the group of the first positive contacts and the first negative contacts of a pair of batteries in order to isolate the contacts from each other and from electrical communication with the conductor of the device. Additionally a track may be provided for guiding movement of the blocking member in the device.

In these respects, the battery saving electron flow blocking system according to the present invention substantially departs from the conventional concepts and designs of the prior art, and in so doing provides an apparatus primarily developed for the purpose of controlling the flow of electrons between a pair of batteries removably installed in a device.

SUMMARY OF THE INVENTION

In view of the foregoing disadvantages inherent in the known types of battery powered devices now present in the prior art, the present invention provides a new battery saving electron flow blocking system construction wherein the same can be utilized for controlling the flow of electrons between a pair of batteries removably installed in a device.

The general purpose of the present invention, which will be described subsequently in greater detail, is to provide a new battery saving electron flow blocking system apparatus and method which has many of the advantages of the battery powered devices mentioned heretofore and many novel features that result in a new battery saving electron flow blocking system which is not anticipated, rendered obvious, suggested, or even implied by any of the prior art blocking systems, either alone or in any combination thereof.

To attain this, the present invention generally comprises a blocking member comprising a panel movable into a position adjacent to one of the group of the first positive contacts and the first negative contacts in order to isolate the contacts from electrical communication with the conductor of the device. Additionally a track may be provided for guiding movement of the blocking member in the device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical, disclosure of the application. The abstract is neither intended to define the invention of the application, which is measured by the claims, nor is it intended to be limiting as to the scope of the invention in any way.

It is therefore an object of the present invention to provide a new battery saving electron flow blocking system apparatus and method which has many of the advantages of the battery powered devices mentioned heretofore and many novel features that result in a new battery saving electron flow blocking system which is not anticipated, rendered obvious, suggested, or even implied by any of the prior art blocking systems, either alone or in any combination thereof.

It is another object of the present invention to provide a new battery saving electron flow blocking system which may be easily and efficiently manufactured and marketed.

It is a further object of the present invention to provide a new battery saving electron flow blocking system which is of a durable and reliable construction.

An even further object of the present invention is to provide a new battery saving electron flow blocking system which is susceptible of a low cost of manufacture with regard to both materials and labor, and which accordingly is then susceptible of low prices of sale to the consuming public, thereby making such battery saving electron flow blocking system economically available to the buying public.

Still yet another object of the present invention is to provide a new battery saving electron flow blocking system which provides in the apparatuses and methods of the prior art some of the advantages thereof, while simultaneously overcoming some of the disadvantages normally associated therewith.

Still another object of the present invention is to provide a new battery saving electron flow blocking system for controlling the flow of electrons between a pair of batteries removably installed in a device.

Yet another object of the present invention is to provide a new battery saving electron flow blocking system which includes a blocking member comprising a panel movable into a position adjacent to one of the group of the first positive contacts and the first negative contacts in order to isolate the contacts from electrical communication with the conductor of the device. Additionally a track may be provided for guiding movement of the blocking member in the device.

Still yet another object of the present invention is to provide a new battery saving electron flow blocking system that would extend the life of batteries by preventing a loss of energy that occurs when there is electron flow between the batteries, even when a switch on the affected device is in an off position and the power circuit is open.

Even still another object of the present invention is to provide a new battery saving electron flow blocking system that reduces likelihood of batteries exploding due to an over abundant electron flow into one battery from another battery.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
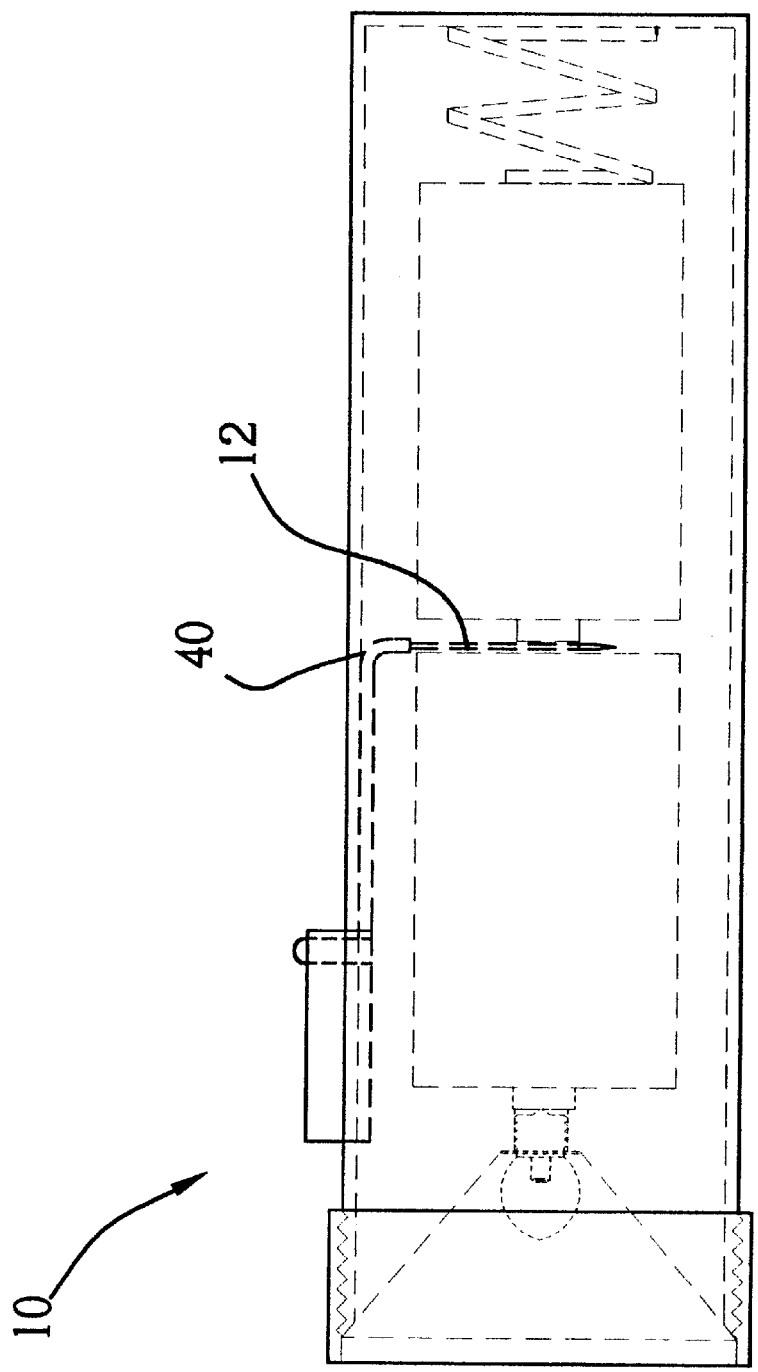
FIG. 1 is a schematic side view of a new battery saving electron flow blocking system according to the present invention showing a blocking member in a track being mounted in a housing of a device having removable batteries.
Figure 3:
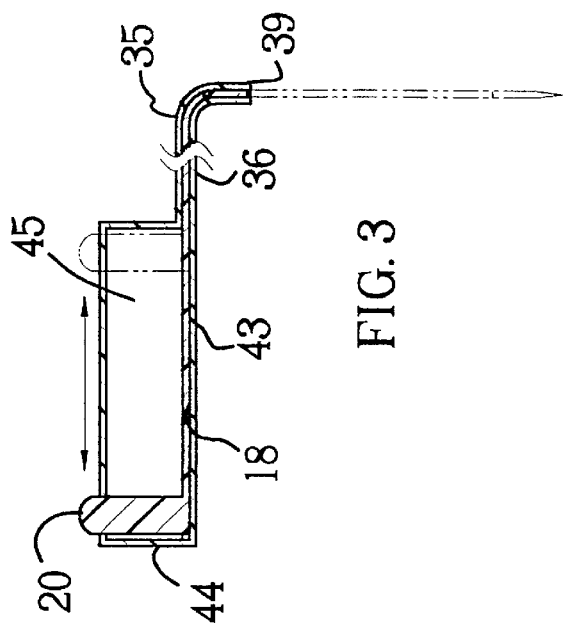
FIG. 3 is a schematic cross-sectional view of the present invention taken along line 3—3 of FIG. 2 showing the blocking member being movably positioned in the track.
Figure 4:
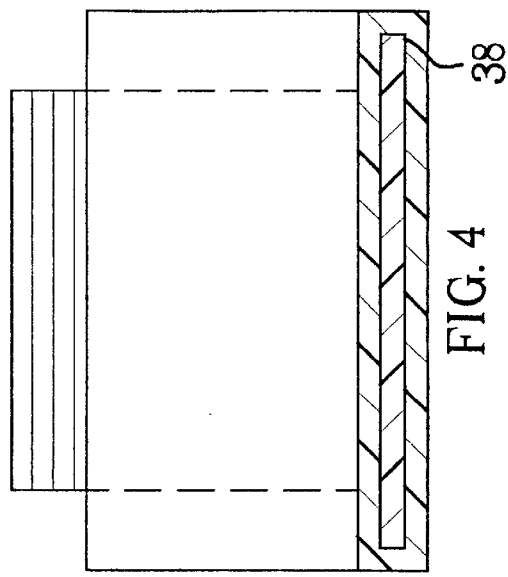
FIG. 4 is a schematic cross-sectional view of the present invention taken along line 4—4 of FIG. 2 showing the blocking member positioned in a tubular portion of the track.

With reference now to the drawings, and in particular to FIGS. 1 through 7 thereof, a new battery saving electron flow blocking system embodying the principles and concepts of the present invention and generally designated by the reference numeral 10 will be described.

Figure 5:
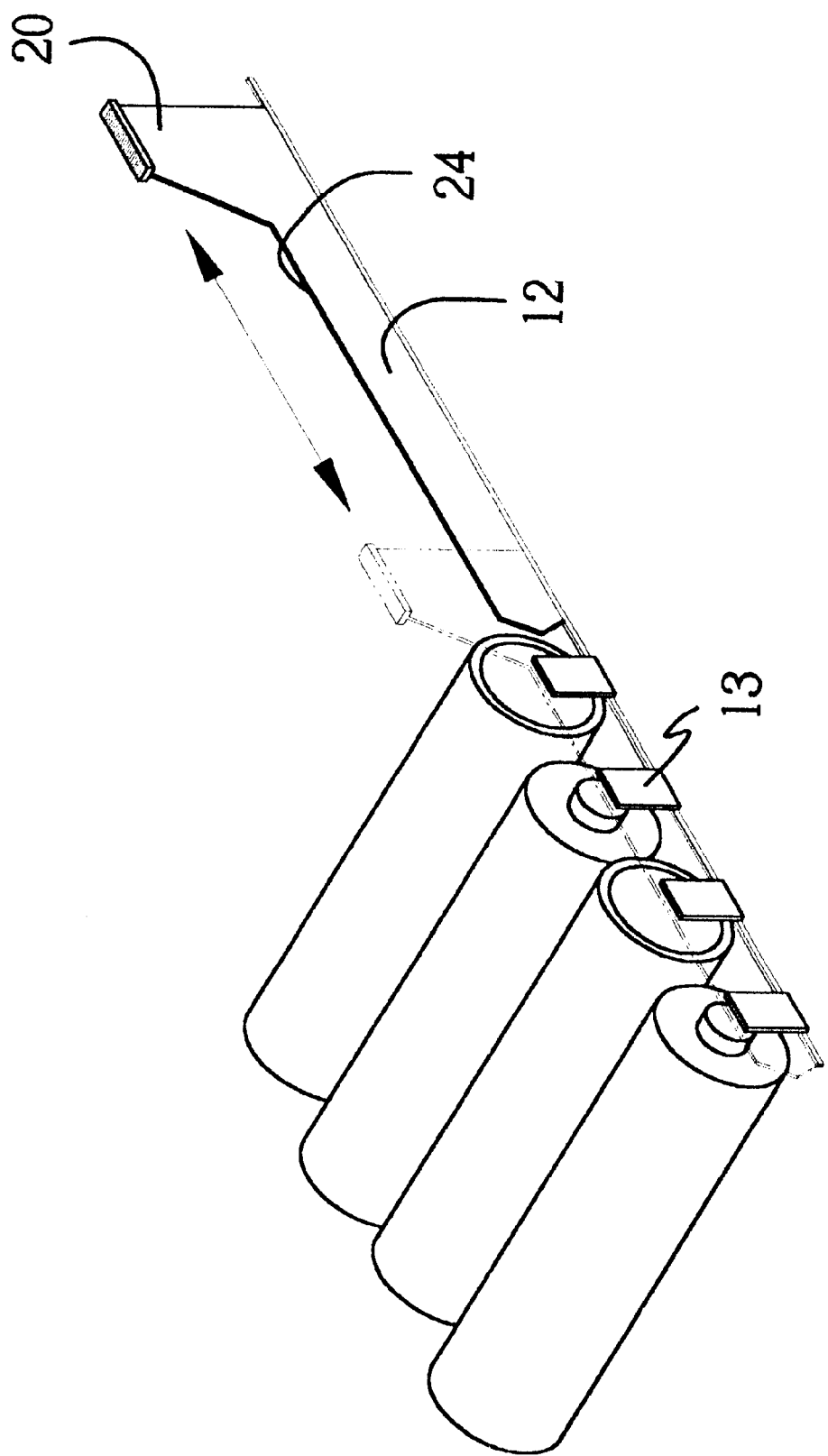
FIG. 5 is a schematic perspective view of the present invention showing an embodiment having the blocking member without a track.
Figure 6:
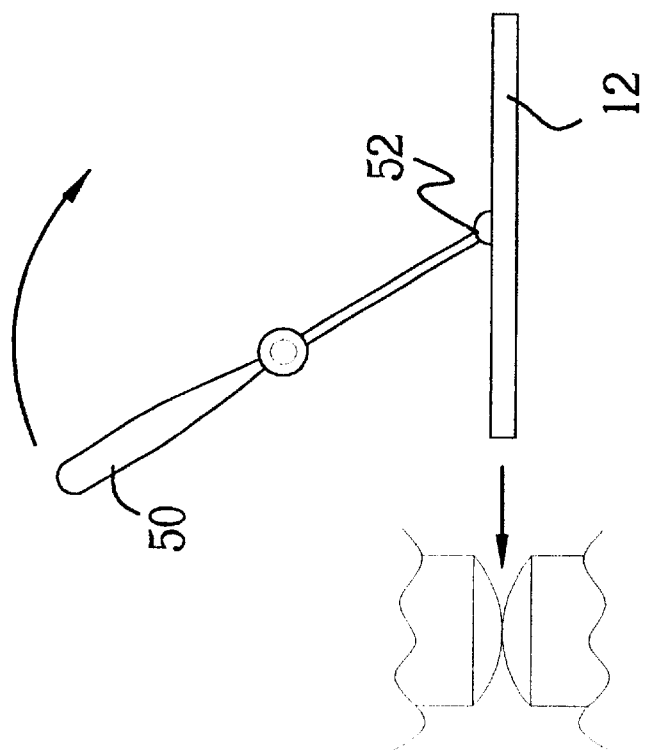
FIG. 6 is a schematic frontal view of the present invention showing a lever pivotally coupled to the blocking member in an unblocked position.

As best illustrated in FIGS. 1 through 7, the battery saving electron flow blocking system 10 generally comprises a blocking system for selectively blocking electron movement between a pair of removable batteries installed in a device. Each of the batteries has a positive contact and a negative contact. The negative contact is part of the negatively charge anode where the electron flow exits the battery. The positive contact is part of the positively charged cathode where the electron flow enters the battery. As illustrated in FIG. 1, a first positive contact of a first one of the pair of batteries is electrically connected to a first negative contact of a second one of the pair of batteries. Electrons can flow between the first positive contact and the first negative contact causing a loss of energy. As illustrated in FIG. 5, the device may include a conductor 13 for contacting the first positive contact and the first negative contact where the batteries are in a parallel connection. Here, the electrons can flow between the first positive contact and the first negative contact through the conductor 13. As illustrated in FIG. 6, the blocking system may also block the flow of electrons between a negative contact of a single battery and a conductor 13 of the device.

The blocking system comprises a blocking member 12 for selectively blocking movement of electrons between the positive and negative contacts of the pair of batteries and between the first positive and negative contacts and the conductor 13. The blocking member 12 comprises a panel 14 movable into a position adjacent to one of the group of the first positive contact and the first negative contact in order to isolate the contacts from electrical communication with themselves and with the conductor 13 of the device.

The blocking member 12 is movably positionable in a housing of the device between a blocked position and an unblocked position. In one embodiment, as illustrated in FIG. 5, the blocked position is defined by a portion of the blocking member 12 being movably positioned between the conductor 13 and one of the first positive and first negative contacts. The unblocked position is defined by the portion of the blocking member being removed from between the conductor 13 and one of the first positive and first negative contacts of the batteries. In one embodiment, as illustrated in FIGS. 1 and 6, the blocked position is defined by a portion of the blocking member being movably positioned between the first positive contact and the first negative contact and between the first negative contact and the conductor 13. The unblocked position is defined by the portion of the blocking member being removed from between the first positive contact and the first negative contact and from between the first negative contact and the conductor 13.

The blocking member 12 is elongated and includes a first end 16 and a second end 18. The blocking member 12 preferably comprises a generally flexible and nonconductive material such as, for example, a plastic material.

Figure 2:
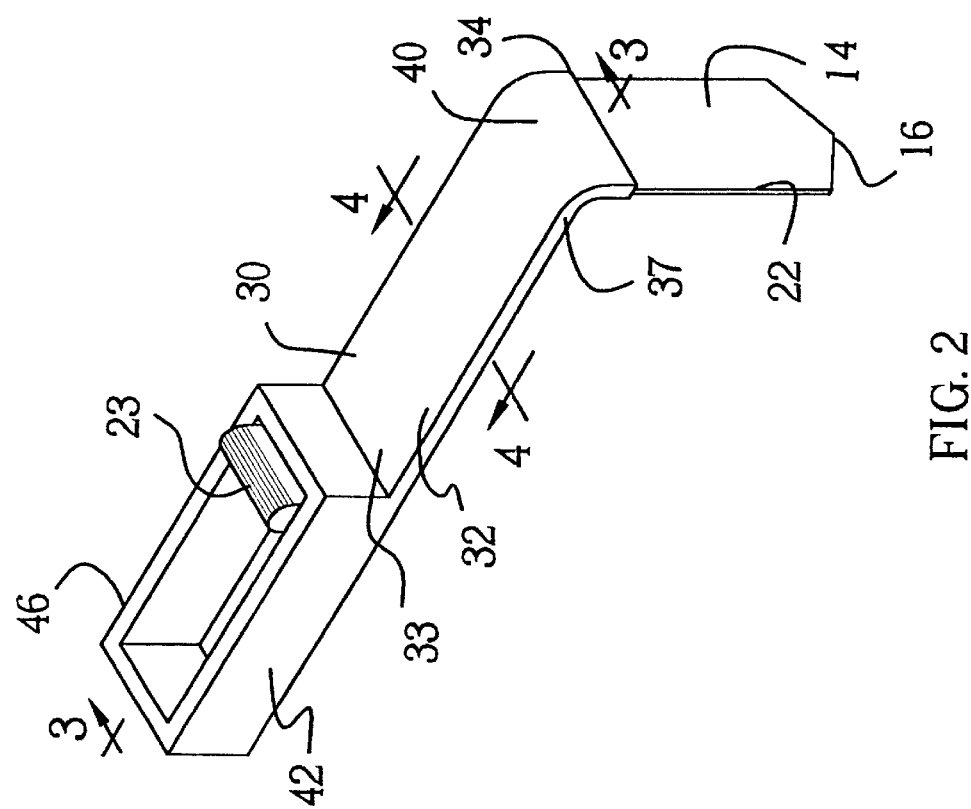
FIG. 2 is a schematic perspective view of the present invention showing the blocking member positioned in the track.

As illustrated in FIGS. 2, a protruding member 20 may be mounted on the panel 14 for facilitating movement by a finger of the blocking member 12 between the blocked and unblocked positions. The protruding member 20 may be attached to an upper surface 22 of the panel 14. In one embodiment, as is illustrated in FIG. 5, the protruding member 20 is mounted on a lateral side edge 24 of the panel 14. The protruding member 22 is positioned generally adjacent to the second end 18 of the blocking member.

A track 30 may be provided for guiding the blocking member 12 in a housing of the device. The track 30 may comprise a tubular portion 32 and a second portion 42 attached together. In one embodiment, the tubular portion 32 has a first end 33, a second end 34, a top wall 35 and a bottom wall 36, a pair of side walls 37 is coupled to and extending between the top 35 and bottom 36 walls of the tubular portion 32 to define an interior 38. Each of the ends 33 and 34 of the tubular portion 32 includes a hole 39. The tubular portion 32 may include a bend 40 therein for positioning the first end 16 of the blocking member 12 between the pair of batteries. The bend 40 is positioned generally between the first end 33 and the second end 34 of the tubular portion 32 and generally nearer the second end 34 than the first end 33 of the tubular portion 32. In one embodiment, the first end 16 of the blocking member 12 is movably positioned in the interior 38 of the tubular portion 32 and is extendable through the housing of the device.

In one embodiment, the second portion 42 is coupled to the first end 33 of the tubular portion 32. The second portion 42 includes a bottom wall 43, a perimeter wall 44 is coupled to and extending away from the bottom wall 43 such that a cavity 45 is defined. The second end 18 of the blocking member 12 extends into and is movably positioned in the cavity 45. A free end 23 of the protruding member 20 extends upwardly beyond a free edge 46 of the perimeter wall 44. In one embodiment, the track 30 is attached to the housing of the device.

Figure 7:
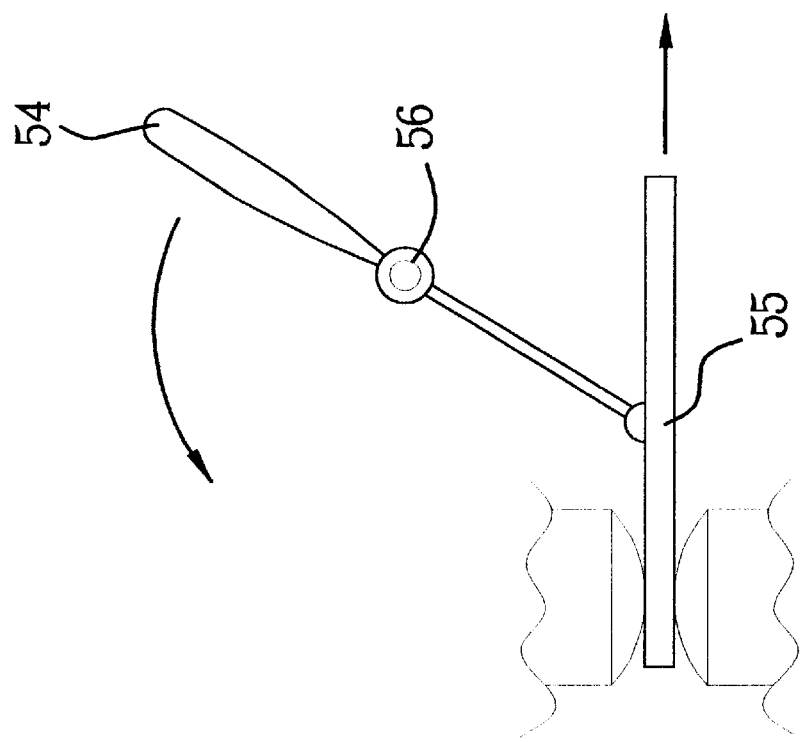
FIG. 7 is a schematic frontal view of the present invention showing the lever pivotally coupled to the blocking member in a blocked position.

In one embodiment, as illustrated in FIGS. 6 and 7, a lever 50 may be provided for pivotally positioning the blocking member 12 in a position adjacent to one of the group of the first positive contact and the first negative contact in order to isolate the negative contact from electrical communication with the conductor 13 of the device. The lever 50 has a first end 52 and a second end 54. The first end 52 may be pivotally coupled to a medial portion 55 of said blocking member 12. A central portion 56 of the lever 50 is preferably pivotally coupled to the housing of the device.

In use, the blocking member 12 prevents electron flow between the first positive contact and the first negative contact of the batteries by preventing electrical communication between the first positive contact and first negative contact, either by directly separating the contacts or by separating the any of the contacts from the conductor 13 of the device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A blocking system for selectively blocking electron movement between a pair of removable batteries or between a battery and a conductor installed in a device, wherein each of the batteries has a positive contact and a negative contact, a first positive contact of a first one of said pair of batteries being electrically connected to a first negative contact of a second one of said pair of batteries, the device having the conductor contacting the first positive contact and the first negative contact for permitting electron flow therebetween, said system comprising:

a blocking member comprising a panel movable into a position adjacent to one of the group of the first positive contact and the first negative contact to isolate the contacts from electrical communication with the conductor of the device, said blocking member being movably positionable in the device between a blocked position and an unblocked position, wherein said blocked position is defined by a portion of said blocking member being movably positioned between the conductor and one of the first positive and first negative contacts such that electron flow therebetween is prevented, wherein said unblocked position is defined by said portion of said blocking member being removed from between the conductor and one of the first positive and first negative contacts of the batteries such that electron flow therebetween is permitted; and a track for guiding movement of said blocking member relative to the device between said blocked position and said unblocked position.

2. The blocking system of claim 1, wherein said blocking member comprises a substantially nonconductive material.

3. The blocking system of claim 1, additionally comprising a protruding member mounted on said panel for facilitating movement by a finger of said blocking member between said blocked and unblocked positions.

4. The blocking system of claim 3, wherein said protruding member is attached to an upper surface of said panel.

5. A blocking system for selectively blocking electron movement between a pair of removable batteries or between a battery and a conductor installed in a device, wherein each of the batteries has a positive contact and a negative contact, a first positive contact of a first one of said pair of batteries being electrically connected to a first negative contact of a second one of said pair of batteries, the device having the conductor contacting the first positive contact and the first negative contact for permitting electron flow therebetween, said system comprising:

a blocking member comprising a panel movable into a position adjacent to one of the group of the first positive contact and the first negative contact to isolate the contacts from electrical communication with the conductor of the device; and a track for guiding movement of said blocking member in the device;

wherein said track comprises a tubular portion defining an interior, said tubular portion having ends, each end having a hole extending therein, said blocking member being movably positioned in said interior of said tubular portion.

6. The blocking system of claim 5, wherein said tubular portion has a bend therein for positioning said first end of said blocking member between the pair of batteries.

7. The blocking system of claim 5, wherein said track also comprises a second portion that is coupled to a first of said ends of said tubular portion, said second portion having a bottom wall, a perimeter wall being coupled to and extending away from said bottom wall such that a cavity is defined, said second end of said blocking member extending into and being movably positioned in said cavity.

8. The blocking system of claim 5, wherein said track is attached to a housing of the device.

9. A blocking system for selectively blocking electron movement between a pair of removable batteries or between a battery and a conductor installed in a device, wherein each of the batteries has a positive contact and a negative contact, a first positive contact of a first one of said pair of batteries being electrically connected to a first negative contact of a second one of said pair of batteries, the device having the conductor contacting the first positive contact and the first negative contact for permitting electron flow therebetween, said system comprising:

- a blocking member comprising a panel movable into a position adjacent to one of the group of the first positive contact and the first negative contact to isolate the contacts from electrical communication with the conductor of the device; and
- a lever for pivotally positioning said blocking member into a position adjacent to one of the group of the first positive contact and the first negative contact to isolate the contacts from electrical communication with the conductor of the device.

10. The blocking system of claim 9, wherein said lever has a first end and a second end, said first end being pivotally coupled to a medial portion of said blocking member, a central portion of said lever being pivotally coupled to a housing of the device.

11. The blocking system of claim 9, wherein said blocking member is movably positionable in the device between a blocked position and an unblocked position, wherein said blocked position is defined by a portion of said blocking member being movably positioned between the first positive contact and the first negative contact of the batteries such that electron flow therebetween is prevented, wherein said unblocked position is defined by said portion of said blocking member being removed from between the first positive and first negative contacts of the batteries such that electron flow therebetween is permitted.

\* \* \* \* \*